United States Patent [19]

Ayukawa

[11] Patent Number: 5,470,280
[45] Date of Patent: Nov. 28, 1995

[54] BELT TENSIONER

[75] Inventor: Kazumasa Ayukawa, Yamatokoriyama, Japan

[73] Assignee: Unitta Company, Osaka, Japan

[21] Appl. No.: 281,103

[22] Filed: Jul. 27, 1994

[30] Foreign Application Priority Data

Mar. 18, 1994 [JP] Japan ..................... 6-073822

[51] Int. Cl.⁶ ..................................... F16H 7/12
[52] U.S. Cl. ............................................. 474/135
[58] Field of Search ..................... 474/101, 112, 474/133, 135, 139

[56] References Cited

U.S. PATENT DOCUMENTS

| | | | |
|---|---|---|---|
| 4,536,172 | 8/1985 | Burris et al. | 474/135 |
| 4,596,538 | 6/1986 | Henderson | 474/117 X |
| 4,689,037 | 8/1987 | Bytzek | 474/135 |
| 4,696,663 | 9/1987 | Thomey et al. | 474/133 |
| 4,725,260 | 2/1988 | Komorowski et al. | 474/135 |
| 4,784,631 | 11/1988 | Henderson | 474/135 |
| 4,816,011 | 5/1989 | Kotzab | 474/111 |
| 4,826,471 | 2/1989 | Ushio | 474/135 |
| 4,832,666 | 5/1989 | Henderson | 474/135 |
| 4,934,988 | 6/1990 | Kawamura et al. | 474/135 X |
| 4,978,326 | 12/1990 | Henderson | 474/135 |
| 5,083,983 | 1/1992 | Hirai et al. | 474/135 |

FOREIGN PATENT DOCUMENTS

| | | |
|---|---|---|
| 0361899 | 4/1990 | European Pat. Off. |
| 3929753 | 1/1991 | Germany. |
| 4300178 | 4/1994 | Germany. |
| 2201221 | 8/1988 | United Kingdom. |
| 2213557 | 8/1989 | United Kingdom. |
| 2258287 | 2/1993 | United Kingdom. |

OTHER PUBLICATIONS

Patent Abstracts of Japan; 3–163245; Hirai et al.; Jul. 1991.

*Primary Examiner*—Roger J. Schoeppel
*Attorney, Agent, or Firm*—Longacre & White

[57] ABSTRACT

A belt tensioner having a tensioner arm swingably connected to a stationary member about a swing shaft and a belt engaging member for engaging a belt and rotatably arranged at the tensioner arm. A first urging member urgings the tensioner arm rotationaly around the swing shaft so that the belt engaging member tensions the belt. A damping member arranged between the stationary member and the tensioner arm so that friction is produced between the stationary member and the damping member in order to damp a swinging motion of the tensioner arm when the tensioner arm swings. A second urging member urges the damping member toward the stationary member or vice versa in order to produce the friction.

21 Claims, 6 Drawing Sheets

BELT TENSIONER

BACKGROUND OF THE INVENTION

1. Field of the Invention

The present invention relates to an improvement in a belt tensioner mainly utilized in a belt driving system for an automobile engine.

2. Description of the Related Art

This kind of belt tensioner is utilized in order to positively transmit a driving force by preventing slack when the driving force is transmitted to a plurality of devices by a single belt. This kind of belt tensioner is disclosed in publications such as Japanese Examined Patent Publication No. 62-2182.

In the conventional belt tensioner disclosed in the above Publication, a tensioner arm is rotationally connected to a stationary member fixed to an engine block and a pulley is rotatably provided on the arm. A torsion spring is provided between the stationary member and the tensioner arm, and the torsion spring urges the tensioner arm rotationally so that the pulley tensions the belt. Also, the torsion spring has a function to urge a damping member secured to the, tensioner arm toward the stationary member, and thereby a damping force for damping the vibration of the tensioner arm, when the tensioner arm swings, is produced.

In the conventional belt tensioner described above, however, since the torsion spring functions both to urge the tensioner arm rotationally and to urge the damping member in order to produce a damping force, when the; torsional degree of the torsion spring is changed according to the rotary position of the tensioner arm, a spring force produced by the torsion spring for urging the damping member is changed. Therefore, a problem arises in that the damping force is changed according to the rotary position of the tensioner arm.

SUMMARY OF THE INVENTION

An object of the present invention is to provide a belt tensioner capable of producing constant damping force regardless of the rotary position of the tensioner arm.

Therefore, according to the present invention, there is provided a belt tensioner comprising: a stationary member; a tensioner arm connected to the stationary member via a swing shaft and being swingable about the swing shaft with respect to the stationary member; a belt engaging member for engaging a belt and rotatably arranged on the tensioner arm via a rotatable shaft, the belt engaging member being rotated by the belt; a coiled spring coiled around the swing shaft, the coiled spring urging the tensioner arm rotationaly around the swing shaft so that the belt engaging member tensions the belt; a damping member arranged between the stationary member and the tensioner arm so that friction is produced between the stationary member and the damping member in order to damp a swinging motion of the tensioner arm when the tensioner arm swings; and urging means for urging the damping member toward the stationary member in order to produce the friction.

Further, according to the present invention, there is provided a belt tensioner comprising: a stationary member; a tensioner arm connected to the stationary member via a swing shaft and being swingable about the swing shaft with respect to the stationary member; a belt engaging member for engaging a belt and rotatably arranged at the tensioner arm via a rotatable shaft, the belt engaging member being rotated by the belt; a coiled spring coiled around the swing shaft, the coiled spring urging the tensioner arm rotationaly around the swing shaft so that the belt engaging member tensions the belt; a damping member arranged between the stationary member and the tensioner arm so the friction is produced between the tensioner arm and the damping member in order to damp a swinging motion of the tensioner arm when the tensioner arm swings; and urging means for urging the damping member toward the tensioner arm in order to produce the friction.

Furthermore, according to the present invention, there is provided a belt tensioner comprising: a stationary member; a tensioner arm connected to the stationary member via a swing shaft and being swingable about the swing shaft with respect to the stationary member; a pulley for engaging a belt and rotatably arranged at the tensioner arm via a rotatable shaft parallel to the swing shaft; a coiled spring coiled around the swing shaft, the coiled spring urging means for urging the tensioner arm so that the pulley tensions the belt and arranged between the stationary member and the tensioner arm a damping member provided on the tensioner arm, friction being produced between the stationary member and the damping member in order to damp a swinging motion of the tensioner arm when the tensioner arm swings; and urging means for urging the damping member toward the stationary member in order to produce the friction.

The present invention may be more fully understood from the description of preferred embodiments of the invention set forth below, together with the accompanying drawings.

DESCRIPTION OF THE PREFERRED EMBODIMENTS

A first embodiment of a belt tensioner of the present invention is described below.

Figure 1:
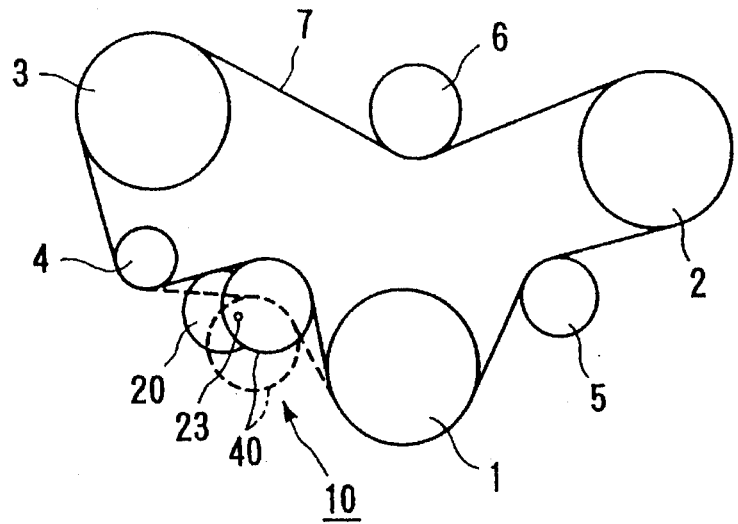
FIG. 1 is a front view of a belt system for an automobile engine.

The belt tensioner of the first embodiment is utilized for a belt system of an automobile engine, for example, shown in FIG. 1. This belt system comprises a driving pulley 1 attached to an output shaft of an engine, a driven pulley 2 for an air conditioner, a driven pulley 3 for a power steering device, a driven pulley 4 for an alternator, idler pulleys 5 and 6, and a belt tensioner 10. A single driving belt 7 is sustained among each pulley.

The belt tensioner 10 comprises a stationary member 20 fixed to an engine block, and a tensioner pulley 40 supported on the stationary member 20 swingably around a pivot bolt 23 which is a swing shaft. The tensioner pulley 40 is urged upward in FIG. 1 by an urging means provided in the stationary member 20, and the driving belt 7 is tensioned by urging force. The driving belt 7 is engaged with the tensioner pulley 40 by swinging the tensioner pulley 40 to a position shown by a broken line in the drawing.

Figure 2:
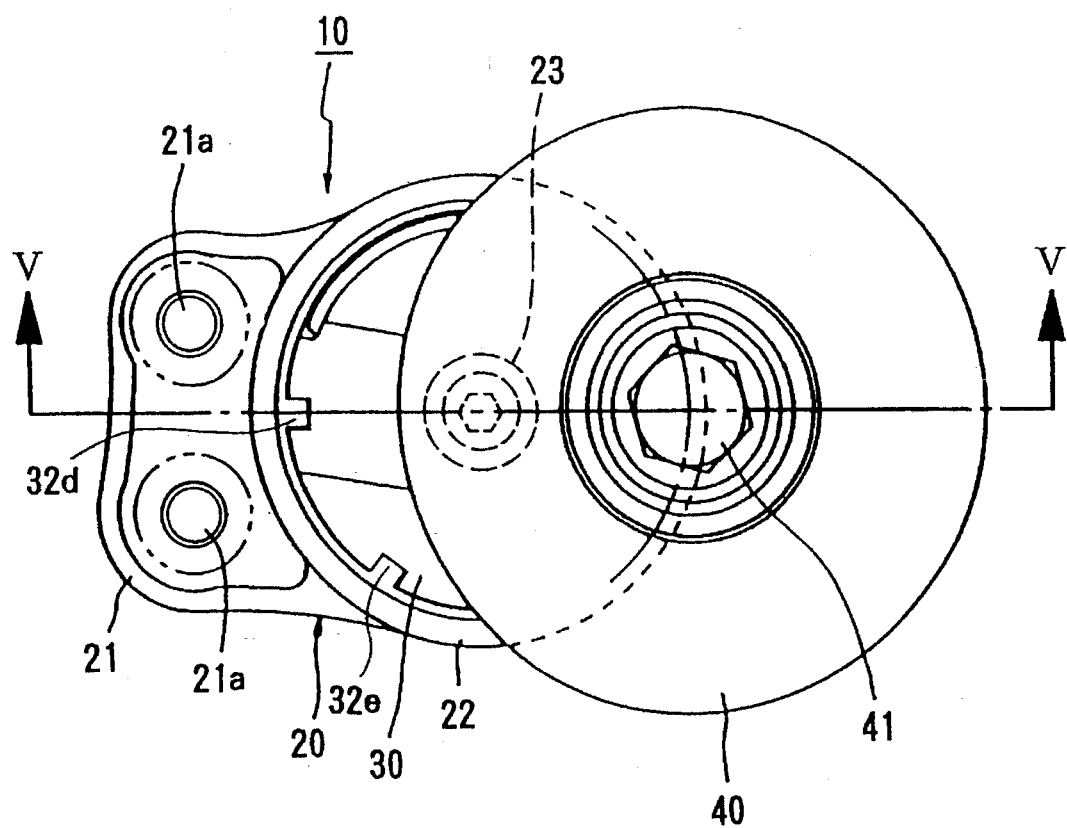
FIG. 2 is a plan view showing an external appearance of a belt tensioner of a first embodiment of the present invention.
Figure 3:
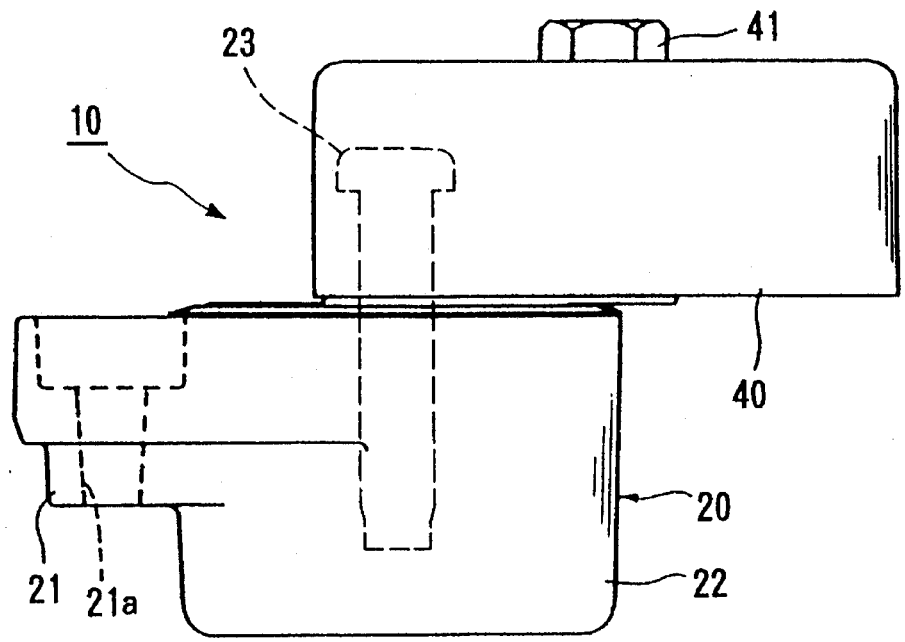
FIG. 3 is a side view showing an external appearance of a belt tensioner of the first embodiment of the present invention.
Figure 4:
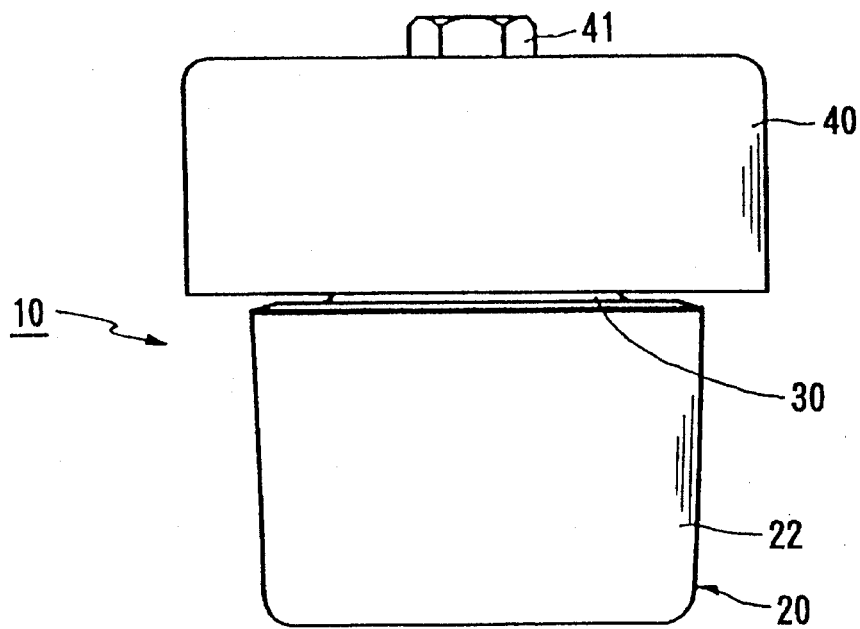
FIG. 4 is an elevational view showing an external appearance of a belt tensioner of the first embodiment according to the present invention.

The basic construction of the belt tensioner 10 of the first embodiment is described referring to FIG. 2 through FIG. 4.

A tensioner arm 30 is swingably connected to the stationary member 20 and a tensioner pulley 40 is rotatably provided on the tensioner arm 30 via a pulley bolt 41. The stationary member 20 comprises an attaching portion 21 in which two attaching holes 21a are formed, and a cylindrical tensioner cup 22 in which a torsion spring described hereinafter is arranged.

Figure 5:
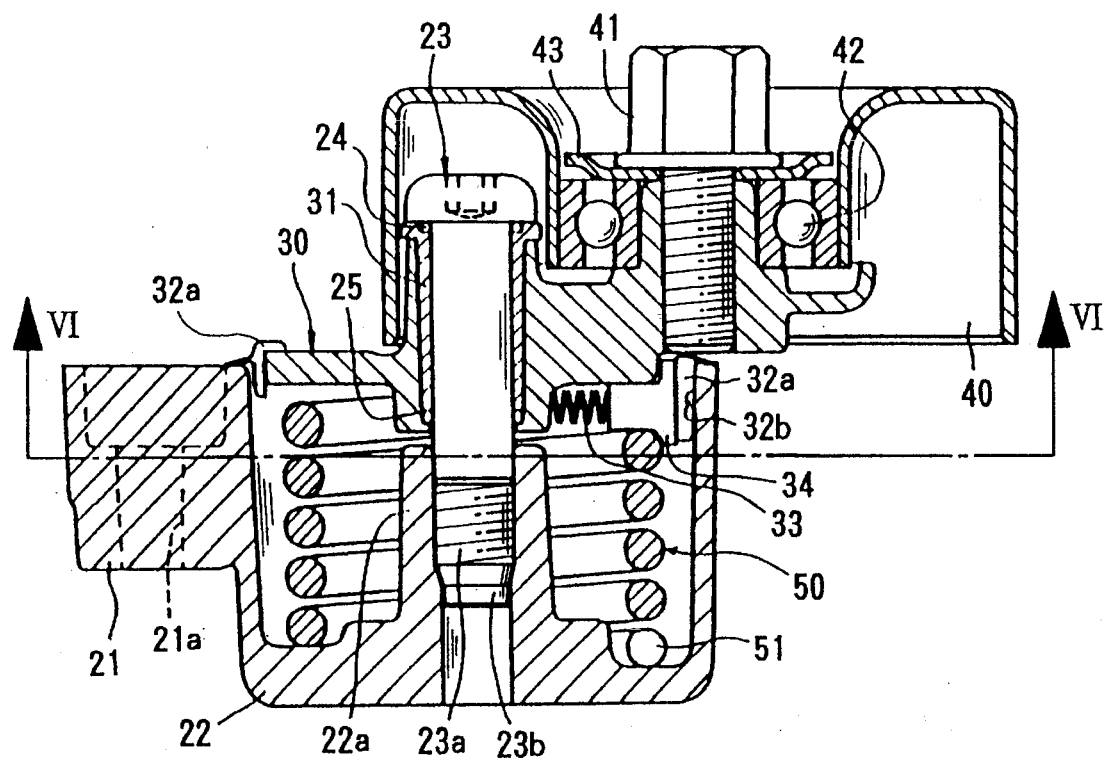
FIG. 5 is a cross-sectional view of the belt tensioner taken along the line V—V in FIG. 2.
Figure 6:
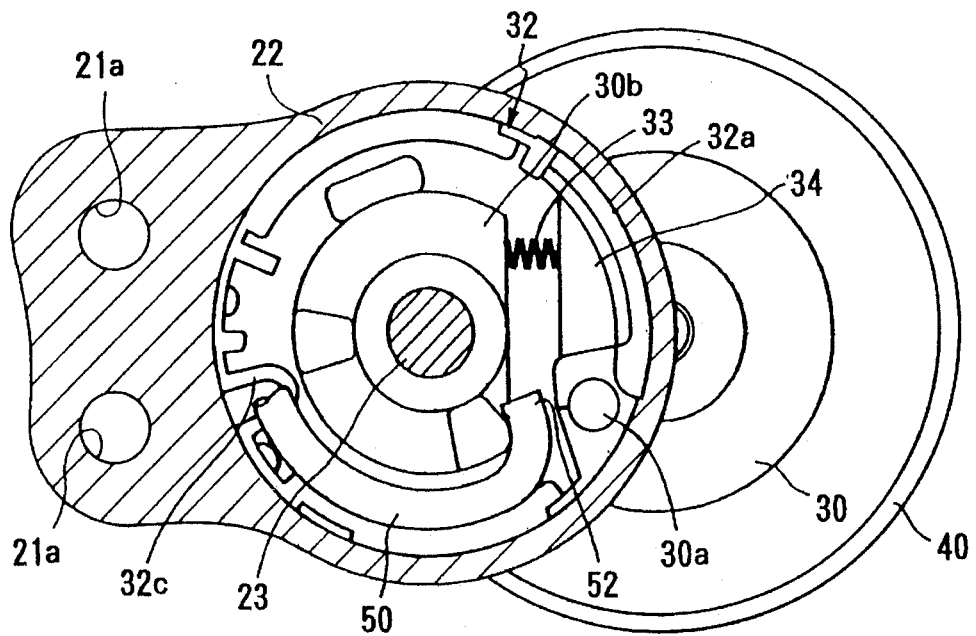
FIG. 6 is a plan view of the tensioner arm taken along the line VI—VI in FIG. 5.

FIGS. 5 and 6 show the structure of the belt tensioner of the first embodiment. A bolt engaging portion 22a, formed out of a maleable material such as aluminum alloy, extends upward in the tensioner cup 22 from the center of the bottom of the tensioner cup 22 in which a torsion spring 50 is arranged, and the pivot bolt 23 is engaged with the bolt engaging portion 22a. A connecting portion of the tensioner arm 30 is arranged in the tensioner cup 22 and connected to the tensioner cup 22 via the pivot bolt 23.

At the lower tip of the pivot bolt 23, a screw portion 23a and a pilot portion 23b are formed to form a step. The outer diameter of the pilot portion 23b is between the crest diameter and the root diameter of the screw portion 23a.

A pivot bushing 31 fixed to the tensioner arm 30 is positioned around the pivot bolt 23, and an upper O-ring 24 and a lower O-ring 25 are respectively provided at the upper end and the lower end of the pivot bushing 31.

The axial movement of the pivot bushing 31 is limited by the head portion of the pivot bolt and the rotary movement thereof is possible with a predetermined resistance. Thereby the tensioner arm 30 becomes swingable about the pivot bolt 23 with respect to the stationary member 20.

One end 51 of the torsion spring 50 is fixed to the bottom of the tensioner cup 22 and the other end 52 thereof is fixed to the tensioner arm 30. Accordingly, the torsion spring 50 functions as a first urging means which urges the tensioner arm 30 rotationally about the pivot bolt 23 so that the tensioner pulley tensions the driving belt engaged by the tensioner pulley 40.

The tensioner pulley 40 is rotatably attached to the tensioner arm 30 via a ball bearing 42, by a pulley bolt 41. Between the head portion of the pulley bolt 41 and the ball bearing 42, a dust shield 43 for preventing penetration of dust is arranged.

FIG. 6 is a plan view of the tensioner arm 30 of the belt tensioner in FIG. 5, taken along the line VI—VI in FIG. 5. An annular damping band 32 is secured around the circumference of the connecting portion of the tensioner arm 30 adjacent to the inner circumference of the tensioner cup 22.

The damping band 32 is sustained by a rotatable pin 30a provided at the tensioner arm 30, and is secured to the tensioner arm 30 by two fingers 32d and 32e (see FIG. 2) formed on the opposite portion to the rotatable pin 30a.

A sliding portion 32a which is projected outwardly by 0.5 mm from the other part of the outer circumferential surface of the damping band 32 to contact the inner surface of the tensioner cup 22 is formed on a part of the outer circumferential surface of the damping band 32, and a groove 32b for storing grease is formed on the outer circumferential surface of the sliding portion 32a along the circumference thereof as shown in FIG. 5. Since the grease storing groove becomes a cause of a fatigue failure if the grease storing groove is formed axially, the grease storing groove is formed circumferentially. Although a single groove is formed in this embodiment, a plurality of grooves may be formed.

A U-shaped hanging portion 32c extending radially inwardly is formed in the damping band 32 diametrically opposite the sliding portion 32a. The hanging portion 32c absorbs heat distortion of the damping band 32 and functions as a drainage portion for draining water which enters the tensioner cup 22 (see FIG. 9 in the second embodiment).

The sliding portion 32a formed on a part of the damping band 32 is urged radially outwardly by a damping shoe 34 which is arranged in the damping band 32 and receives one end of a compression spring 33.

The damping band 32 is secured to the tensioner arm 30 and functions as a damping member which produces friction between the damping member and the stationary member 20 in order to damp a swinging motion of the tensioner arm 30 when the tensioner arm 30 swings.

Figure 7:
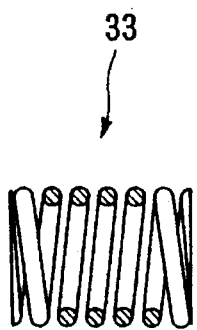
FIG. 7 is a partial cross-sectional side view of the compression spring used in the first embodiment.

The compression spring 33 is a coiled spring as shown in FIG. 7. The compression spring 33 is arranged in a compressed condition between a pivot portion 30b axially projecting from the tensioner arm 30 and the the damping shoe 34, and functions as a second urging means which urges the damping shoe 34 toward the tensioner cup 22 by a constant pressure. The spring force of the coiled spring 33 acts on the center of the outer arc circumferential center of the damping shoe 34 and at the same time on the circumferential center of the sliding portion 32a so that damping force is produced by friction between the sliding portion 32a and the inner circumferential surface of the tensioner cup 22.

The damping shoe 34 requires a sturdy construction since strong forces operate on part of the damping shoe 34. Accordingly, the damping shoe is preferably made from nylon reinforced by glass fiber or plastic reinforced by carbon fiber. On the other hand, the damping band 32 is preferably made from polyacetal, or a macromolecular material such as nylon and the like, containing molybdenum for self-lubrication. The selection of material for the damping band 32 is particularly made with respect to the material of the tensioner cup 22, which is preferably aluminum alloy.

In the belt tensioner of the first embodiment composed as described above, the tensioner arm 30 is urged rotationally by the urging force of the torsion spring 50 and tensions the driving belt 7, and the vibration of the tensioner arm 30 is dampened by a damping force between the damping band 32 and the tensioner cup 22 produced by the compression spring 33.

Figure 8:
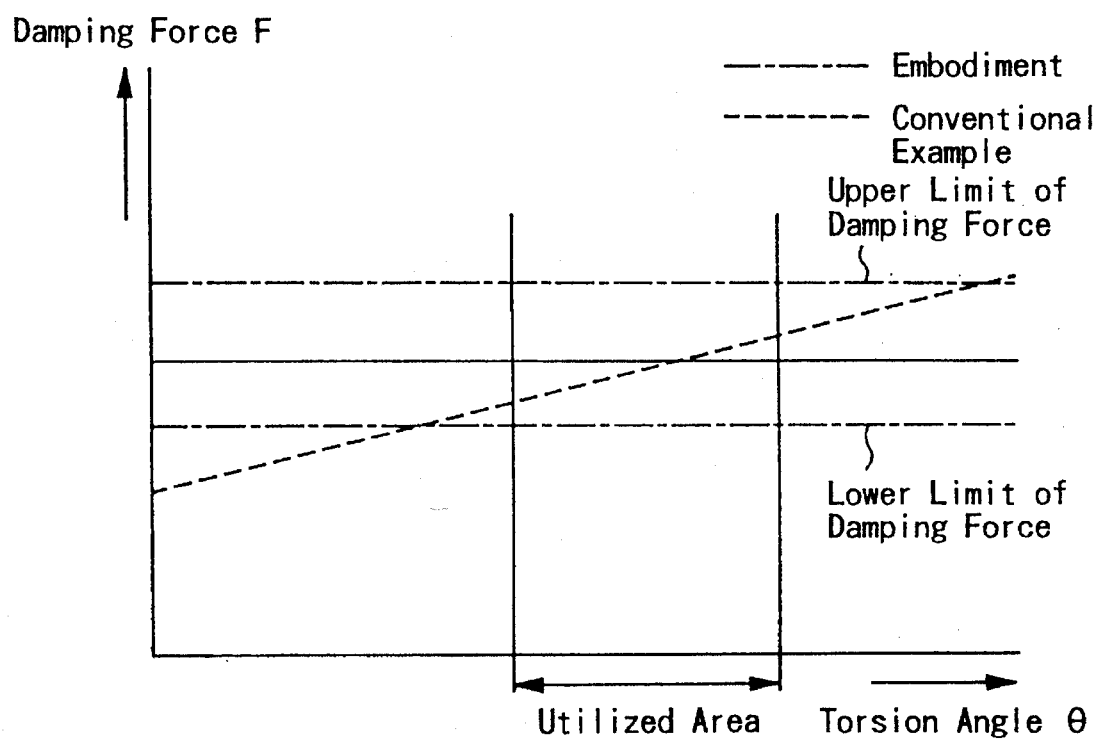
FIG. 8 is a graph showing the relationship between a torsional angle and a damping force F.

Since the damping force is produced by the compression spring 33 independent of the torsion spring 50, the damping force is kept constant regardless of the rotation angle of the tensioner arm 30. FIG. 8 shows the relationship between the torsional angle (rotary angle) of the tensioner arm 30 and the damping force F produced by the friction between the sliding portion 32a and the tensioner cup 22. In the drawing, a solid line shows the first embodiment and the broken line shows conventional example. Although the damping force F increases linearly as the torsional angle θ increases in the conventional example, the damping force F is constant regardless of the torsional angle θ in the first embodiment according to the present invention.

The damping force F is required to be between the upper limit and the lower limit over the entire extent of utilized angle. Accordingly, if the damping force F changes as in the conventional belt tensioner, the tolerance of the torque value of the spring decreases. Namely, the possibility that the damping force is in excess of the upper limit or the lower limit increases. On the contrary, when the damping force F is constant as in the embodiment, the tolerance of the spring torque value increases, and thereby the damping force can be between the upper limit and the lower limit even though the actual torque value is slightly different from the target torque.

Also, in the first embodiment, since the damping force produced by the compression spring 33 can be set independent of the rotary torque produced by the torsional spring 50, the damping force and the rotary torque can be set independently and various requirements can be easily satisfied.

Figure 9:
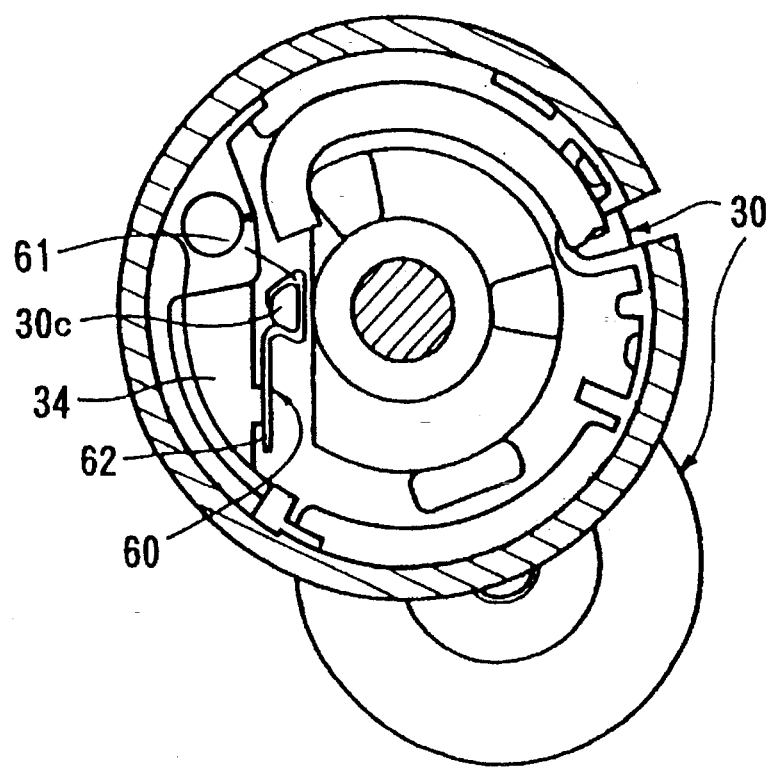
FIG. 9 is a cross-sectional view of a belt tensioner of a second embodiment according to the present invention.

FIG. 9, which is similar to FIG. 6, is a plan view of the belt tensioner of a second embodiment of the present invention. The structure of FIG. 9 is similar to the first embodiment, with a difference being that a flat spring 60 is used as the second urging means.

Figure 10:
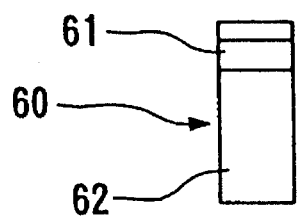
FIG. 10 is a front view of a flat spring used in the second embodiment according to the present invention.
Figure 11:
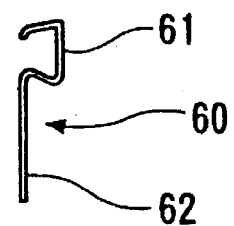
FIG. 11 is a side view of the flat spring used in the second embodiment according to the present invention.

FIG. 10 is a front view of the flat spring used in the second embodiment, and FIG. 11 is a side view thereof. The flat spring comprises an engaging portion 61 engaging with an engaging projection 30c formed in the tensioner arm 30, and an urging portion 62 contacting the damping shoe 34 to urge it outwardly. The thickness and material of the flat spring is selected corresponding to a required damping force.

As described above, according to the embodiments of the present invention, since the rotary urging force operating on the tensioner arm 30 produced by the first urging means 50 and the damping force produced between the damping member 32 and the stationary member 20 by the second urging means 33 can be set independently, the damping force can be kept constant regardless of the rotary angle of the tensioner arm 30, and the tolerance value of the torque of the urging means can be increased.

Furthermore, since the combination of the rotary urging force and the damping force can be independently selected, the belt tensioner according to the present invention can satisfy varied requirements.

Figure 12:
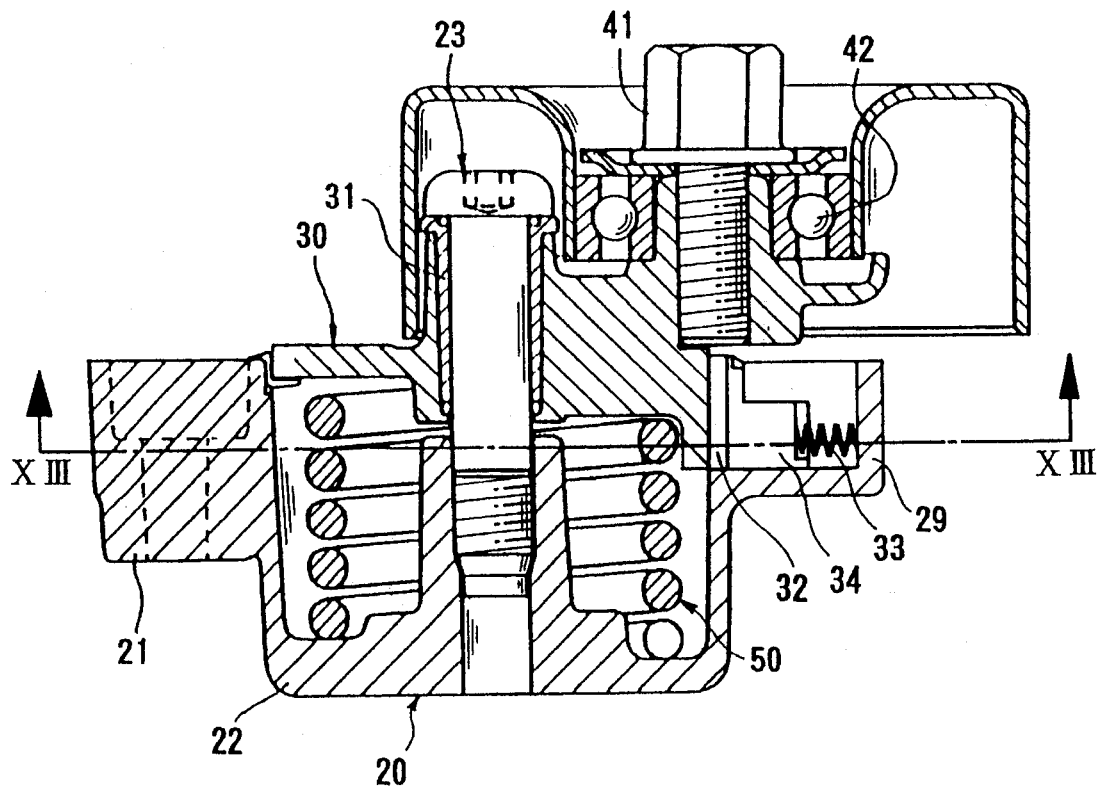
FIG. 12 is a cross-sectional view of a belt tensioner of a third embodiment according to the present invention.
Figure 13:
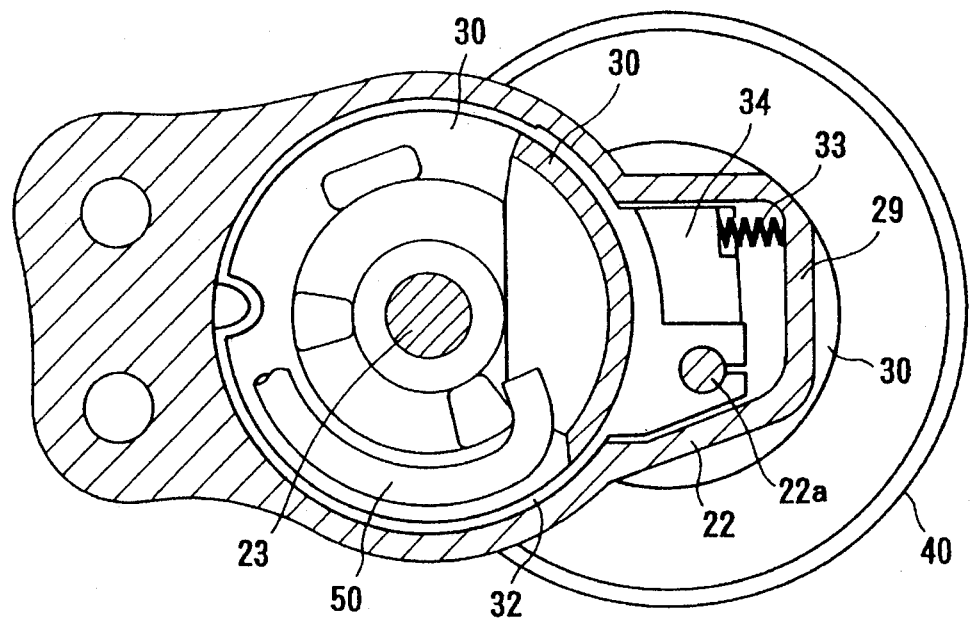
FIG. 13 is a plan view of the tensioner arm taken along the line XIII—XIII in FIG. 12.

FIG. 12 shows the third embodiment according to the present invention, and FIG. 13 is a plan view thereof.

Although the damping member 32 is secured to the tensioner arm 30 in the first and second embodiments, the damping member 32 is secured to the stationary member 20 and slidingly contacted with the tensioner arm 30. Namely, in the third embodiment, friction is produced between the tensioner arm 30 and the damping member 32.

The tensioner cup 22 has an enlarged portion 29 projecting outerward the cup 22, and a pin 22a is formed on a bottom surface of the enlarged portion 29. The damping band 32 is fixed to the pin 22a, and an inner surface 32a of the damping band 32 is slidingly contacted with an outer surface of the tensioner arm 30. The damping shoe 34 is arranged outside the damping band 32 and receives one end of the compression spring 33, the other end of which is engaged with an inner wall of the enlarged portion 29.

While the invention has been described with reference to specific embodiments chosen for purposes of illustration, it should be apparent that numerous modifications could be made thereto by those skilled in the art without departing from the basic concept and scope of the invention.

I claim:

1. A belt tensioner comprising:

a stationary member;

a tensioner arm connected to said stationary member via a swing shaft and being swingable about said swing shaft with respect to said stationary member;

a belt engaging member for engaging a belt and rotatably arranged on said tensioner arm via a rotatable shaft, said belt engaging member being rotated by said belt;

a coiled spring coiled around said swing shaft, said coiled spring urging said tensioner arm rotationally around said swing shaft so that said belt engaging member tensions said belt;

a damping member arranged between said stationary member and said tensioner arm so that friction is produced between said stationary member and said damping member in order to damp a swinging motion of said tensioner arm when said tensioner arm swings; and urging means for urging said damping member toward said stationary member swing shaft in a direction substantially perpendicular to a longitudinal axis of said swing shaft in order to produce said friction.

2. A belt tensioner according to claim 1, wherein said swing shaft is parallel to said rotatable shaft.

3. A belt tensioner according to claim 1, wherein said belt engaging member is a pulley.

4. A belt tensioner according to claim 1, wherein a first end of said coiled spring is connected to said stationary member and a second end thereof is connected to said tensioner arm.

5. A belt tensioner according to claim 1, wherein said damping member is connected to said tensioner arm through said urging means and slidingly contacted with said stationary member.

6. A belt tensioner according to claim 5, wherein said stationary member comprises a cylindrical cup-shaped portion, a part of said tensioner arm arranged in said cup-shaped portion is connected to said stationary member via said swing shaft arranged at the center of said cup-shaped portion, and said damping member is secured to an outer circumference of said part of said tensioner arm and slidingly contacted with a inner circumference of said cup-shaped portion.

7. A belt tensioner according to claim 6, wherein said damping member is an annular band and a sliding portion formed at only a part of an outer circumference of said annular band slidingly contacts the inner circumference of said cup-shaped portion.

8. A belt tensioner according to claim 7, wherein a groove for storing grease is formed on said sliding portion of said annular band along a circumference thereof.

9. A belt tensioner according to claim 7, wherein said urging means urges said sliding portion toward said stationary member.

10. A belt tensioner according to claim 9, further comprising a damping shoe arranged between said sliding portion and said urging means, said urging means urging said sliding portion via said damping shoe.

11. A belt tensioner according to claim 10, wherein said damping shoe is made from nylon reinforced by glass fiber.

12. A belt tensioner according to claim 10, wherein said damping shoe is made from plastic reinforced by carbon fiber.

13. A belt tensioner according to claim 7, wherein said annular band comprises a U-shaped hanging portion curved inwardly for absorbing heat distortion of said annular band.

14. A belt tensioner according to claim 1, wherein said urging means is a compression spring.

15. A belt tensioner according to claim 1, wherein said urging means is a flat spring.

16. A belt tensioner according to claim 1, wherein said damping member is made from polyacetal.

17. A belt tensioner according to claim 1, wherein said damping member is made from macromolecular material containing molybdenum.

18. A belt tensioner according to claim 1, wherein said stationary member comprises a cylindrical cup-shaped portion having an open end, said tensioner arm being at least partially received in said cup-shaped portion, wherein said damping member is disposed adjacent said open end and slidingly contacts an inner circumference of said cup-shaped portion.

19. A belt tensioner comprising:

a stationary member;

a tensioner arm connected to said stationary member via a swing shaft and being swingable about said swing shaft with respect to said stationary member;

a belt engaging member for engaging a belt and rotatably arranged at said tensioner arm via a rotatable shaft, said belt engaging member being rotated by said belt;

a coiled spring coiled around said swing shaft, said coiled spring urging said tensioner arm rotationally around said swing shaft so that said belt engaging member tensions said belt;

a damping member arranged between said stationary member and said tensioner arm so that friction is produced between said stationary member and said damping member in order to damp a swinging motion of said tensioner arm when said tensioner arm swings; and urging means for urging said damping member toward said tensioner arm in a direction substantially perpendicular to a longitudinal axis of said swing shaft in order to produce said friction.

20. A belt tensioner according to claim 19, wherein said damping member is provided on said stationary member and slidingly contacted with said tensioner arm.

21. A belt tensioner comprising:

a stationary member;

a tensioner arm connected to said stationary member via a swing shaft and being swingable about said swing shaft with respect to said stationary member;

a pulley for engaging a belt and rotatably arranged at said tensioner arm via a rotatable shaft parallel to said swing shaft;

a coiled spring coiled around said swing shaft and defining an outer radial circumference, said coiled spring urging said tensioner arm so that said pulley tensions said belt and arranged between said stationary member and said tensioner arm;

a damping member provided on said tensioner arm and positioned substantially outside of said outer radial circumference, friction being produced between said stationary member and said damping member in order to damp a swinging motion of said tensioner arm when said tensioner arm swings; and urging means for urging said damping member toward said stationary member in order to produce said friction.

* * * * *

UNITED STATES PATENT AND TRADEMARK OFFICE
CERTIFICATE OF CORRECTION

PATENT NO. : 5,470,280
DATED : November 28, 1995
INVENTOR(S) : AYUKAWA, Kazumasa It is certified that error appears in the above-indentified patent and that said Letters Patent is hereby corrected as shown below:

On the title page, item [57], "ABSTRACT", line 4, "urgings" should be changed to --urges--.

Column 6, line 52 (claim 7, line 2), "hand" should be changed to --band--.

Signed and Sealed this

Twenty-fourth Day of December, 1996

Attest:

BRUCE LEHMAN

*Attesting Officer*  *Commissioner of Patents and Trademarks*